United States Patent
Bae et al.

(10) Patent No.: US 8,018,804 B2
(45) Date of Patent: Sep. 13, 2011

(54) METHOD AND APPARATUS TO DETERMINE AN OPTIMUM REPRODUCING CONDITION ON AN OPTICAL RECORDING MEDIUM

(75) Inventors: Jae-cheol Bae, Suwon-si (KR); Joo-ho Kim, Yongin-si (KR); In-oh Hwang, Seongnam-si (KR); Hyun-soo Park, Seoul (KR); Narutoshi Fukuzawa, Tokyo (JP); Takashi Kikukawa, Tokyo (JP); Tatsuhiro Kobayashi, Tokyo (JP)

(73) Assignees: Samsung Electronics Co., Ltd., Suwon-si (KR); TDK Corporation, Tokyo (JP)

( * ) Notice: Subject to any disclaimer, the term of this patent is extended or adjusted under 35 U.S.C. 154(b) by 910 days.

(21) Appl. No.: 11/641,069

(22) Filed: Dec. 19, 2006

(65) Prior Publication Data

US 2007/0140083 A1    Jun. 21, 2007

(30) Foreign Application Priority Data

Dec. 20, 2005  (KR) .......................... 10-2005-126264

(51) Int. Cl.
*G11B 7/00* (2006.01)
(52) U.S. Cl. .................................... 369/47.53
(58) Field of Classification Search ............... 369/47.53
See application file for complete search history.

(56) References Cited

U.S. PATENT DOCUMENTS

| 7,158,462 B2* | 1/2007 | Ogawa | 369/59.23 |
| 7,542,404 B2* | 6/2009 | Yusu et al. | 369/275.1 |
| 2003/0227852 A1 | 12/2003 | Ogawa | |
| 2005/0063274 A1* | 3/2005 | Nagano et al. | 369/59.11 |
| 2005/0105418 A1 | 5/2005 | Kuwahara et al. | |
| 2005/0117507 A1 | 6/2005 | Hwang et al. | |
| 2005/0147007 A1* | 7/2005 | Nakano et al. | 369/47.53 |
| 2005/0157631 A1 | 7/2005 | Lee et al. | |
| 2005/0169140 A1 | 8/2005 | Adachi et al. | |
| 2005/0255282 A1* | 11/2005 | Fukuzawa et al. | 428/64.4 |

FOREIGN PATENT DOCUMENTS

| TW | 200506930 | 7/1993 |
| TW | 577060 | 2/2004 |
| TW | I231488 | 4/2005 |
| WO | WO 2005078709 A1 * | 8/2005 |

OTHER PUBLICATIONS

Office Action issued in corresponding European Patent Application No. 06835293.9 dated Dec. 12, 2008.
Taiwanese Preliminary Notice of Office Action on May 21, 2010, in corresponding Taiwanese Application No. 095147897 (6 pages).

* cited by examiner

*Primary Examiner* — Adam R Giesy
(74) *Attorney, Agent, or Firm* — NSIP Law

(57) ABSTRACT

A method of determining an optimum reproduction condition of a first mark recorded on an optical recording medium that is smaller than a resolution of a pickup to reproduce the first mark. The method includes obtaining an optimum reproduction condition of a second mark having a length which closely approximates the resolution of the pickup, and determining the optimum reproduction condition of the first mark using the obtained optimum reproduction condition of the second mark.

11 Claims, 4 Drawing Sheets

METHOD AND APPARATUS TO DETERMINE AN OPTIMUM REPRODUCING CONDITION ON AN OPTICAL RECORDING MEDIUM

CROSS-REFERENCE TO RELATED APPLICATION

This application claims the benefit of Korean Patent Application No. 2005-126264, filed on Dec. 20, 2005, in the Korean Intellectual Property Office, the disclosure of which is incorporated herein by reference.

BACKGROUND OF THE INVENTION

1. Field of the Invention

Aspects of the present invention relate to an optical recording medium, and, more particularly, to a method and apparatus to determine an optimum reproducing condition on a super resolution optical recording medium.

2. Description of the Related Art

Methods of reproducing data from super resolution optical disks are different from those of other existing optical disks. The super resolution disk, that allows a reproduction of information of recorded or previously formed pits, according to the change in an optical refractive index due to a constant temperature increase, has a very rapid reproduction power critical value, as shown in FIG. 1. When a 75 nm length mark (corresponding to a 2T mark) and a 112.5 nm length mark (corresponding to a 3T mark) are recorded by a pickup using a light beam having a wavelength 405 nm and an NA of 0.85, such that a resolution of the pickup is 119 nm (=405 nm/(4× 0.85)), a carrier noise ratio (CNR) sharply increases at a reproduction power of about 1.8 mW. It can be seen that a rapid critical phenomenon of the reproduction power has a great influence on the reproduction operation of the super resolution optical disk due to the basic principle of the super resolution optical disk. Thus, determining an optimum reproduction power of the super resolution disk is important.

SUMMARY OF THE INVENTION

To solve the above and/or other problems, an aspect of the present invention provides a method and apparatus to determine an optimum reproduction condition of a super resolution optical recording medium which allows for a recording and a reproduction of a mark smaller than the resolution of a laser beam so that a large amount of information can be used.

According to an aspect of the present invention, there is a method of determining an optimum reproduction condition of marks recorded on an optical recording medium, wherein a length of at least one of the marks is shorter than a resolution of a pickup of a recording/reproducing apparatus, the method comprising: obtaining an optimum reproduction condition of a mark having a length which closely approximates the resolution of the pickup; and determining the optimum reproduction condition of the marks using the obtained optimum reproduction condition of the mark.

The obtaining of the optimum reproduction condition comprises recording a mark having a length closest to the resolution on the optical recording medium, detecting a change in a level of a reproduction radio frequency (RF) signal by emitting a reproduction beam and receiving a beam reflected from the optical recording medium while varying a reproduction power for the optical recording medium, and setting a power of the reproduction beam when the detected level of the reproduction RF signal is maximized as the optimum reproduction power.

According to another aspect of the present invention, there is an apparatus to determine an optimum reproduction condition of marks recorded on an optical recording medium at least one of which is smaller than a resolution of the apparatus, the apparatus comprising: a pickup unit to emit a recording beam to record a mark having a length which closely approximates the resolution of the apparatus on the optical recoding medium, to emit a reproduction beam to reproduce the recorded mark, and to receive the beam having been reflected from the optical recording medium; and a control unit to obtain an optimum reproduction condition of the recorded mark and to determine the optimum reproduction condition of the marks of the optical recording medium using the obtained optimum reproduction condition of the recorded mark.

According to yet another aspect of the present invention, there is a recording and/or reproducing apparatus for use with an optical recording medium in which a length of at least one of the marks, recorded on the medium is smaller than a resolution of the apparatus, the apparatus comprising: a pickup unit to emit a recording beam to record a mark having a length which approximates the resolution of the apparatus on the optical recoding medium, to emit a reproduction beam to reproduce the recorded mark, and to receive the beam having been reflected from the optical recording medium; a detection unit to detect a level of a signal generated by the pickup unit in accordance with the received beam; a control unit to determine a reproduction power of the recorded mark when a size of a signal detected by the detection unit is maximized to be an optimum reproduction power of the marks of the optical recording medium; and a power control unit to control the pickup unit to emit a reproduction beam with the optimum reproduction power determined by the control unit to reproduce the first mark.

The control unit further controls the power control unit to control the pickup unit while varying a power to seek a point when a size of the signal detected by the detection unit is maximized.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
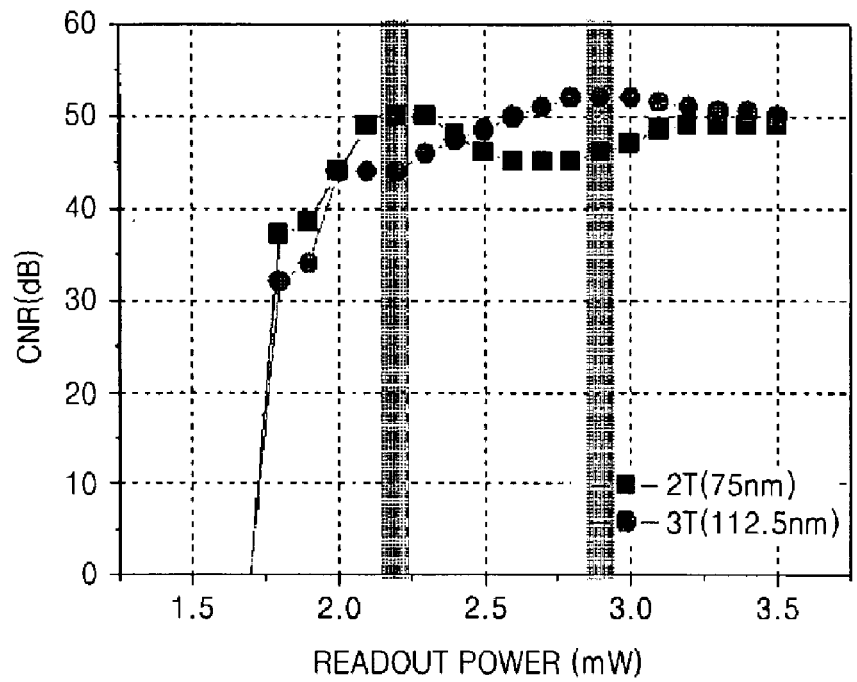
FIG. 1 is a graph showing the reproduction power characteristic of a super resolution optical recording medium according to conventional technology.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

First, the results of several tests to find an optimum reproduction power of a super resolution recording medium are described below. In the tests, a pickup having a wavelength of 405 nm, an NA of 0.85, and a resolution of 119 nm (=405/(4×0.85)) is used. Writing conditions are a linear velocity of 2.5 m/sec, and a writing power Pw of 10.8 mW. Mark lengths of 75 nm and 112.5 nm are used.

The length of the minimum mark formed by a pickup of 405 nm and 0.85 NA on an optical disk is approximately 150 nm. In the tests according to aspects of the present invention, the length of the minimum mark of a super resolution optical disk is set to 75 nm. This length, being half of the normal length of a mark, allows the super resolution optical disk to have a recording capacity which is double that of the ordinary optical disk. When a (1,7) code is used, assuming that a 75 nm length mark is equivalent to a 2T mark, a 112.5 nm length mark corresponds to a 3T mark, which is a mark that most closely approximates the resolution of the pickup (which is, as noted above, 119 nm).

Here, it is noted that, when a bit error rate (BER) is measured, partial response maximum likelihood (PRML), which is a level detection method, is used for the measurement. Of course, it is understood that other level detection methods could also be used.

Figure 2:
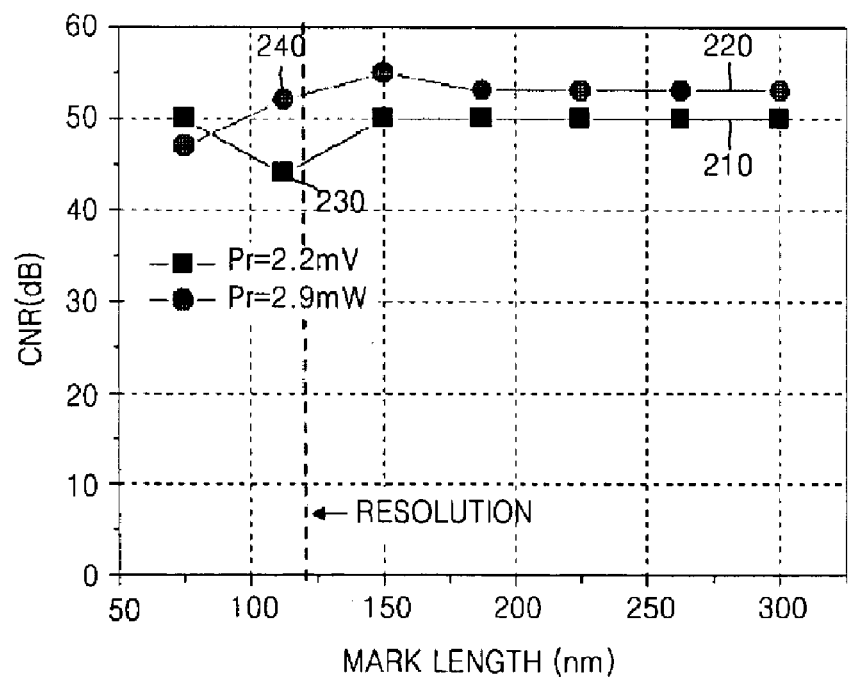
FIG. 2 is a graph showing the relationship between a mark length and CNR when a super resolution optical recording medium is reproduced by using an optimum reproduction power to each of the 2T mark and the 3T mark.

FIG. 2 is a graph illustrating a relationship between a mark length and a carrier noise ratio (CNR) that is detected when data is reproduced from a super resolution optical recording medium using an optimum reproduction power with respect to each of the 2T and 3T marks. As shown in FIG. 2, the graphing of the symbol "■" (210) indicates a CNR using the 2T optimum power, which optimizes a reproduction of the 2T mark. The graphing of the symbol "●" (220) indicates a CNR using the 3T optimum power, which optimizes a reproduction of the 3T mark. When marks are reproduced using the 2T optimum power (i.e., Pr=2.2 mW), it can be seen that a CNR 230 of the 3Tmark having a length which is close to the resolution of the pickup, is significantly lower than other T marks when the marks are reproduced. Also, when the marks are reproduced using the 3T optimum power (i.e., Pr=2.9 mW), it can be seen that a CNR 240 of the 3T is remarkably improved.

It can be seen from FIG. 2 that, when an optimum reproduction power of the super resolution optical recording medium is determined, in view of a CNR of the super resolution optical recording medium, marks should be reproduced using a reproduction power that is capable of optimizing the reproduction of a mark having a length that is close to the resolution of the pickup (e.g., the 3T mark), rather than a reproduction power capable of optimizing the reproduction of the shortest mark (e.g., the 2T mark).

Figure 3:
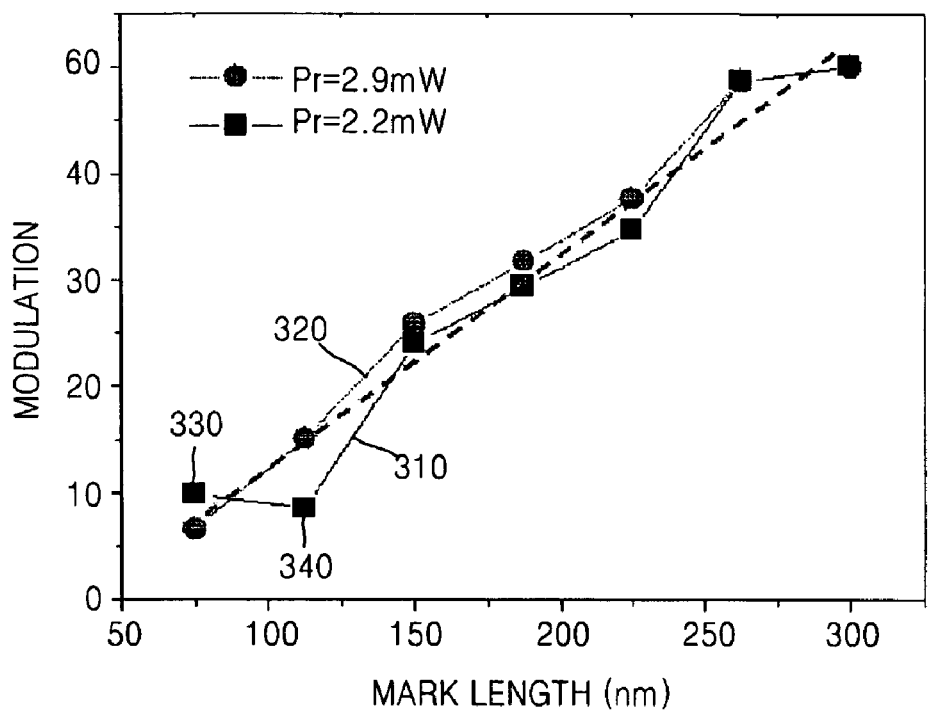
FIG. 3 is a graph showing the relationship between a mark length and modulation when a super resolution optical recording medium is reproduced by using an optimum reproduction power to each of the 2T mark and the 3T mark.

FIG. 3 is a graph showing the relationship between a mark length and modulation when a super resolution optical recording medium is reproduced using an optimum reproduction power to each of the 2T mark and the 3T mark. The modulation is a rate of the shortest T mark with respect to the longest T mark. The modulation tends to linearly increase as the mark length increases.

Referring to FIG. 3, the graphing of the symbol "■" (310) indicates a modulation according to the mark length when marks are reproduced using the 2T optimum power, which optimizes a reproduction of the 2T mark. The graphing of the symbol "●" (320) indicates a modulation according to the mark length when marks are reproduced using the 3T optimum power, which optimizes a reproduction of the 3T mark.

As shown in FIG. 3, when the marks are reproduced using the 2T optimum power (i.e., Pr=2.2 mW), it can be seen that a modulation 330 for the 2T mark has a greater value than a modulation 340 for the 3T mark, which may negatively influence the measured bit error rate (BER). This is due to the fact that, when PRML is used to measure the BER, if the modulation for the 2T mark is greater than the modulation for the 3T mark, the 2T mark and the 3T mark may be confused with each other. However, when the marks are reproduced using the 3T optimum power (i.e., Pr=2.9 mW), as the size of a mark increases, modulation increases substantially linearly, which may positively influence on the measured BER.

Thus, it may be seen from FIG. 3 that, when an optimum reproduction power of the super resolution optical recording medium is determined, in view of modulation, marks should be reproduced using a reproduction power that is capable of optimizing the reproduction of a mark having a length which closely approximates the resolution of the pickup (e.g., the 3T mark), rather than a reproduction power which is capable of optimizing the reproduction of the shortest mark (e.g., the 2T mark).

Figure 4:
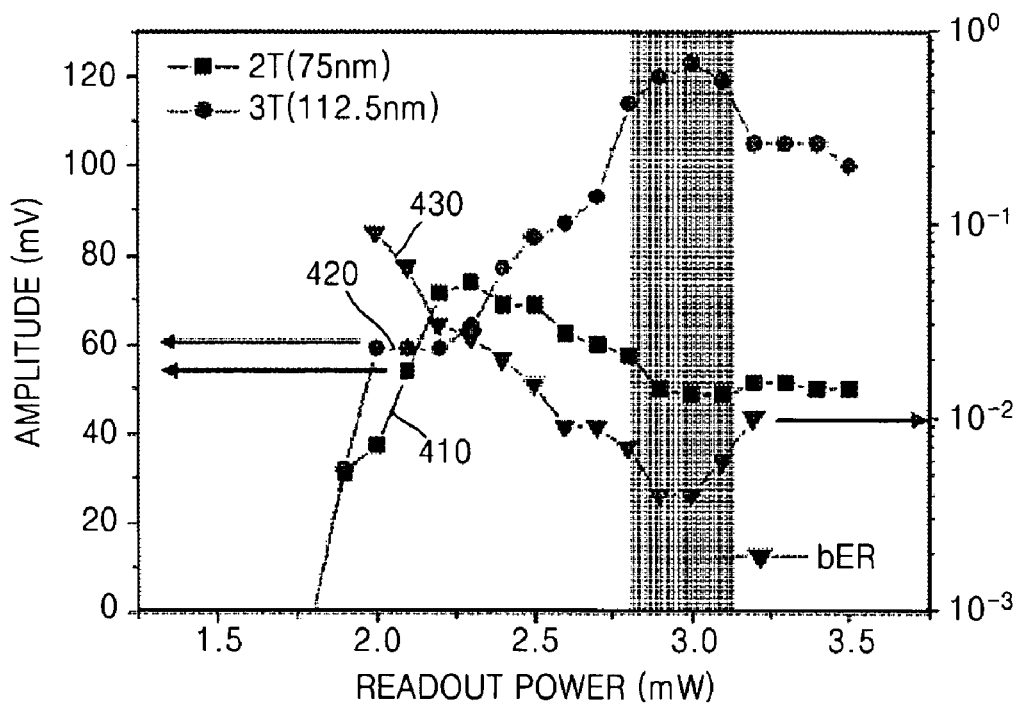
FIG. 4 is a graph showing the relationship between the amplitude and BER according to the reproduction power with respect to the 2T mark and 3T mark in the super resolution optical recording medium.

FIG. 4 is a graph showing the relationship between the amplitude and the BER according to the reproduction power with respect to the 2T mark and 3T mark in the super resolution optical recording medium. Referring to FIG. 4, the graphing of the symbol "■" (410) indicates a radio frequency (RF) level amplitude according to the reproduction power with respect to the 2T mark. The graphing of the symbol "●" (420) indicates an RF level amplitude according to the reproduction power with respect to the 3T mark. The graphing of the symbol "▲" (430) indicates the measured BER according to the reproduction power.

As the readout power of a reproduction beam emitted onto the super resolution recording medium is increased, amplitudes 410 of the 2T RF signal level and 420 of the 3T RF signal level each increase at different rates such that that the amplitudes of the 2T and 3T RF signal levels over a predetermined reproduction power are maximized at different power levels. When the reproduction power is further increased from those maximum power levels, the amplitudes 410 of the 2T RF signal level and 420 of the 3T RF signal level each decrease at different rates. In other words, the reproduction powers at which the amplitudes of the 2T and 3T RF signal levels are respectively maximized are different from each other. That is, the reproduction power, at which the amplitudes of the 2T RF signal level is maximized when the readout power, is in the vicinity of about 2.25 mW while the reproduction power, at which the amplitudes of the 3T RF signal level is maximized when the readout power, is in the vicinity of about 3.00 mW. Meanwhile, it can be seen that the BER is optimally minimized when the readout power is in the vicinity of about 3.0 mW. That is, the BER is optimally minimized when the amplitude of the 3T RF signal level is maximized.

Thus, it can be seen from FIG. 4 that, when an optimum reproduction power of the super resolution optical recording medium is determined, in view of BER, marks should be reproduced using a reproduction power that is capable of optimizing the size of a reproduction signal of a mark having a length which closely approximates the resolution of the pickup (e.g., the 3T mark), rather than a reproduction power that is capable of optimizing the size of a reproduction signal of the shortest mark (e.g., the 2T mark).

According to the result of the comparison between the reproduction power that is optimized for the shortest mark and the reproduction power that is optimized for a mark that closely approximates the resolution of the pickup, with reference to FIGS. 2 through 4, it can be seen that a better effect is obtained by using the reproduction power that is optimized for a mark that closely approximates the resolution of the pickup than by using the reproduction power that is optimized for the shortest mark.

Figure 5:
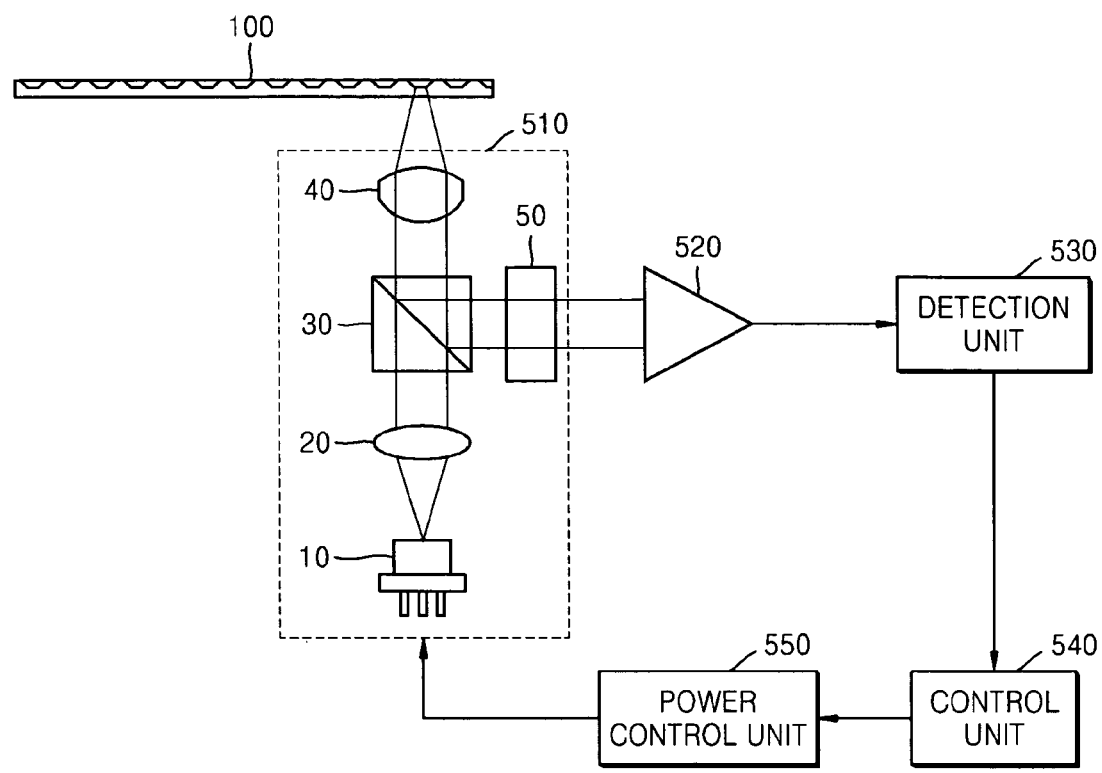
FIG. 5 is a view of a recording and/or reproducing apparatus of a super resolution optical recording medium according to an embodiment of the present invention.

FIG. 5 is a view of a recording and/or reproducing apparatus for use with a super resolution optical recording medium according to an embodiment of the present invention. As shown in FIG. 5, a recording and/or reproducing apparatus includes a pickup unit 510, a calculation unit 520, a detection unit 530, a control unit 540, and a power control unit 550. The pickup unit 510 records a mark on the super resolution recording medium 100 by emitting a light beam toward the super resolution recording medium 100 and/or reproduces the mark by receiving a light beam that is reflected from the super resolution recording medium 100. In particular, to determine an optimum reproduction power of the super resolution recording medium 100, the pickup unit 510 first emits the light beam to record a mark having a length which closely approximates the resolution of the pickup unit 510 and receives the light beam having been reflected from the mark by making a reproduction beam incident on the recording medium 100.

The pickup unit 510 includes a laser diode 10 to emit the light beam, a collimating lens 20 to make the light emitted from the laser diode 10 a parallel beam, a beam splitter 30 to change the proceeding path of incident light, and an objective lens 40 to focus the light passing through the beam splitter 30 onto the super resolution recording medium 100. The light reflected from the super resolution recording medium 100 is reflected by the beam splitter 30 and is received by a photodetector 50. A quadrant photodetector can be used as the photodetector 50. The light received by the photodetector 50 is converted to an electric signal through the calculation unit 520 and output as an RF signal. The detection unit 530 detects a change in the level of an RF signal output from the calculation unit 520 and is output to the control unit 540.

The control unit 540 calculates an optimum reproduction power using a change in the level of the RF signal detected by the detection unit 530. That is, the control unit 540 monitors a change in the level of the RF signal and, then, the control unit 540 determines an optimum reproduction power using the power of the reproduction beam at a point when the RF signal level is maximized. The control unit 540 provides information on the determined optimum reproduction power to the power control unit 550.

In particular, the control unit 540, according to the present embodiment, controls other elements of the recording and/or reproducing apparatus to record a mark having a length which closely approximates the length of the resolution of the pickup unit 510 to obtain an optimum reproduction power of the super resolution recording medium 100. The power control unit 550 adjusts the reproduction power while increasing or decreasing the reproduction power level to seek a point at which the level of the RF signal received from the recorded mark is maximized. Also, the control unit 540 determines the reproduction power at a point at which the level of the RF signal received from the mark having a length which closely approximates the resolution of the pickup unit 510 that is recorded on the super resolution recording medium 100, as an optimum reproduction power of the super resolution recording medium 100, and controls the power control unit 550 to adjust the power of the laser diode 10 using the optimum reproduction power. Further, the control unit 540 controls the pickup unit 510 to record information on the determined reproduction power on a predetermined area in the recording medium 100. The predetermined area can be a lead in area or a lead out area of the recording medium. The recording and/or reproducing apparatus or other recording and/or reproducing apparatus can use the information on the determined reproduction power to obtain optimum reproduction condition.

The power control unit 550 controls the power of a beam emitted from the laser diode 10 using the optimum reproduction power determined by the control unit 540. The power control unit 80 controls the laser diode 10 to emit a light while sequentially increasing the power of the light so that the optimum reproduction power can be calculated by the control unit 540.

Figure 6:
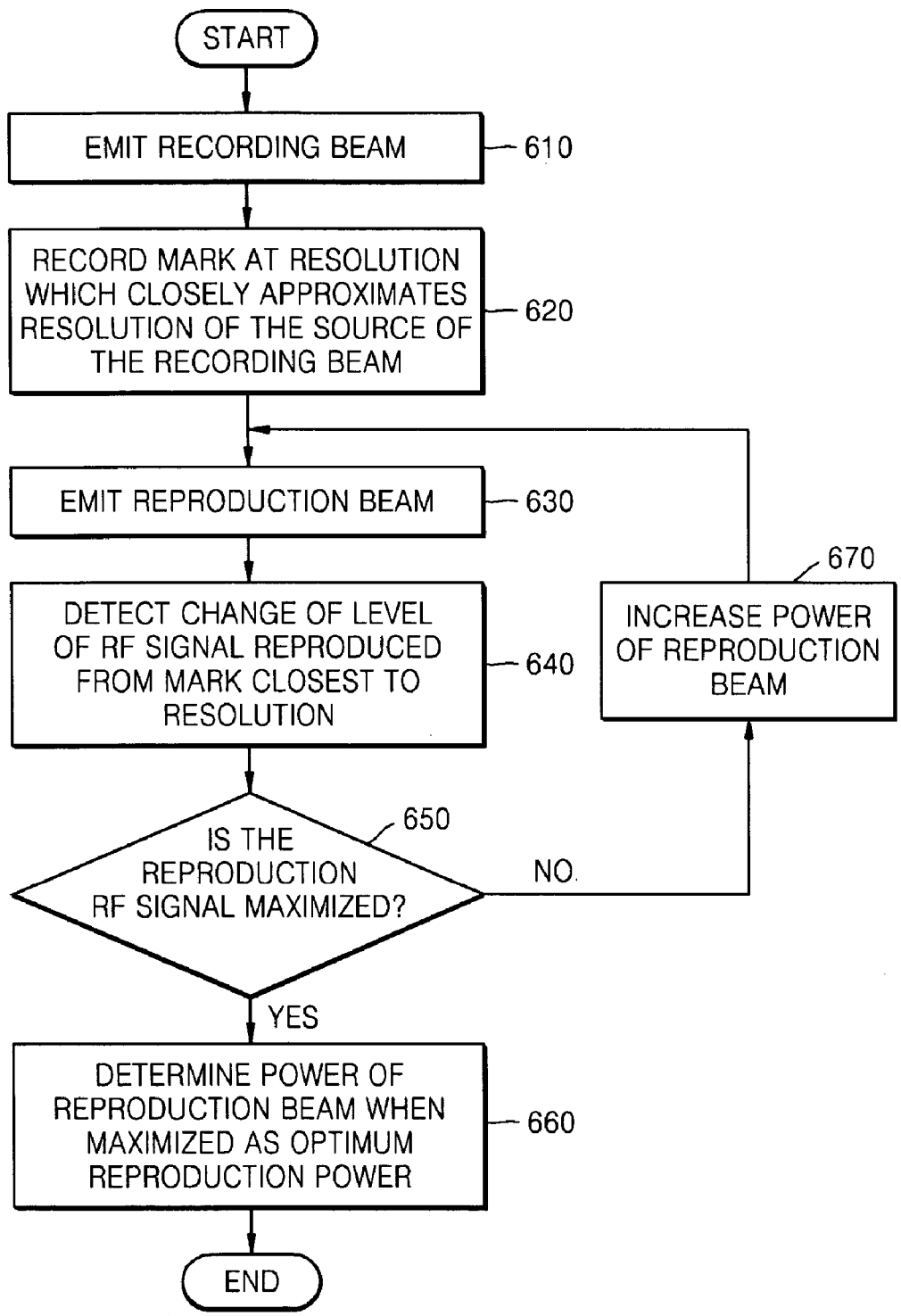
FIG. 6 is a flowchart showing the process of a method of determining an optimum reproduction condition of a super resolution optical recording medium according to an embodiment of the present invention.

FIG. 6 is a flowchart showing the process of a method of determining an optimum reproduction condition of a super resolution optical recording medium according to an embodiment of the present invention. As shown in FIG. 6, a recording beam is emitted to the super resolution recording medium (610) and a mark closest to the resolution of the source of the recording beam is recorded in a mono tone (620). Since the optimum reproduction power is not related to a recording power to emit the recording beam, the recording power does not need to be set to the optimum recording power. A recording power may be set as a recording power for a ROM-pit mark, a pre-recorded mark, or a wobble. As shown in the above test result, for the super resolution recording medium, since the optimum power to reproduce a mark having a length which closely approximates the resolution of the source of the recording beam rather than the shortest mark possible is efficient in view of CNR, modulation, or BER, a mark should be recorded as having a length which is close to the resolution of the source of the recording beam to aid in the determining of the optimum reproduction power.

Next, a reproduction beam is emitted toward the super resolution recording medium (630). While the power of the reproduction beam is sequentially and slightly increased from a low power, the change in the level of a reproduction RF signal is detected using the reproduction power (640).

Whether the level of the reproduction RF signal is maximized, as the result of the detection of change in the reproduction RF signal level, is checked (650). If the reproduction RF signal is not maximized, the power of the reproduction beam is increased (670) and a reproduction beam is again emitted (630). A change in the level of the reproduction RF signal is detected (640) and the operation of determining whether the reproduction RF signal is maximized (650) is repeated. When the power of the reproduction beam no longer increases, even when the reproduction RF signal is maximized, the power of the reproduction beam at that time is determined to be an optimum reproduction power (660). Preferably, information on the determined optimum reproduction power is recorded on a predetermined area in the recording medium. The predetermined area can be a lead in area or a lead out area of the recording medium.

The method of determining an optimum reproducing condition according to aspects of the present invention may be embodied as computer readable codes on a computer readable recording medium. The computer readable recording medium is any data storage device that stores data which may be thereafter read by a computer system. Examples of the computer readable recording medium include read-only memory (ROM), random-access memory (RAM), CD-ROMs, magnetic tapes, floppy disks, optical data storage devices, and a computer data signal embodied in a carrier wave comprising a compression source code segment and an encryption source code segment (such as data transmission through the Internet). The computer readable recording medium may also be distributed over network coupled computer systems so that the computer readable code is stored and executed in a distributed fashion. Also, functional programs, codes, and code segments for accomplishing aspects of the present invention can be easily construed by programmers skilled in the art to which the present invention pertains.

As described above, according to aspects of the present invention, since the reproduction power of the super resolution recording medium is determined optimally, the quality of a signal reproduced from the super resolution recording medium is improved so that high capacity recording and/or reproduction is embodied.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of determining an optimum reproduction condition of marks recorded on a super resolution optical recording medium, wherein a length of at least one of the marks is shorter than a resolution of a pickup of a recording/reproducing apparatus, the method comprising:
    recording the first mark;
    detecting a change in an amplitude of a reproduction radio frequency (RF) signal by emitting a reproduction beam and receiving the beam having been reflected from a position on the optical recording medium where the recorded first mark is located while varying a reproduction power for the optical recording medium; and
    setting a power of the reproduction beam when the detected amplitude of the reproduction RF signal is maximized as the optimum reproduction power of said marks recorded on said optical recording medium,
    wherein the first mark is recorded to have a length which most closely approximates the resolution of the pickup on the optical recording medium.

2. The method according to claim 1, further comprising recording information on the determined optimum reproduction condition on a predetermined area in the optical recording medium.

3. A non-transitory computer readable storage medium having a program stored thereon to execute the method of claim 1.

4. An apparatus to determine an optimum reproduction power of marks recorded on a super resolution optical recording medium at least one of which is smaller than a resolution of the apparatus, the apparatus comprising: a pickup unit configured to: emit a recording beam to record a first mark having a length which most closely approximates the resolution of the apparatus on the optical recording medium; emit a reproduction beam to reproduce the recorded first mark; and receive the beam having been reflected from the optical recording medium; and a control unit configured to: obtain an optimum reproduction power of the recorded first mark; and determine the optimum reproduction power of the marks of the optical recording medium using the obtained optimum reproduction power of the recorded first mark; and a detection unit configured to detect an amplitude of a signal generated by the pickup unit in accordance with the received beam, wherein the control unit is further configured to: control the pickup unit to record the first mark, emit the reproduction beam to the optical recording medium while varying a reproduction power thereof, receive the beam having been reflected from the optical recording medium, detect a change in an amplitude of a reproduction radio frequency (RF) signal from the reflected beam, and set, as an optimum reproduction power of marks recorded on said optical recording medium, the power of the reproduction beam when the detected amplitude of the reproduction RF signal is maximized.

5. The apparatus according to claim 4, wherein the recorded mark is recorded as a mono tone.

6. The apparatus according to claim 4, wherein:
    the length of at least one of the marks is 75 nm; and
    the length of the recorded mark is 112.5 nm.

7. The apparatus according to claim 4, wherein the control unit is further configured to control the pickup unit to record information on the determined optimum reproduction condition on a predetermined area in the optical recording medium.

8. A method of operating a reproducing apparatus to determine an optimum reproduction power to reproduce marks recorded on a super resolution optical recording medium, at least one of the marks being smaller than a resolution of the apparatus, the method comprising: recording a first mark; emitting a reproduction beam to reproduce the recorded first mark while varying a reproduction power thereof; receiving the beam having been reflected from the optical recording medium; detecting a change in an amplitude of a reproduction radio frequency (RF) signal from the reflected beam; obtaining an optimum reproduction power of the recorded first mark when the detected amplitude of the reproduction RF signal is maximized; and determining the optimum reproduction power of the marks of the optical recording medium using the obtained optimum reproduction power of the recorded first mark, wherein the first mark is recorded to have a length which most closely approximates the resolution of the pickup on the optical recording medium.

9. The method according to claim 8, wherein the recorded mark is recorded as a mono tone.

10. The method according to claim 8, wherein:
    the length of at least one of the marks is 75 nm; and
    the length of the second mark is 112.5 nm.

11. A non-transitory computer readable storage medium having a program stored thereon to execute the method of claim 8.

* * * * *